March 10, 1959  J. M. CUNNINGHAM  2,876,880
LOW INERTIA MAGNETIC DISC CLUTCH
Filed Aug. 9, 1956  2 Sheets-Sheet 1
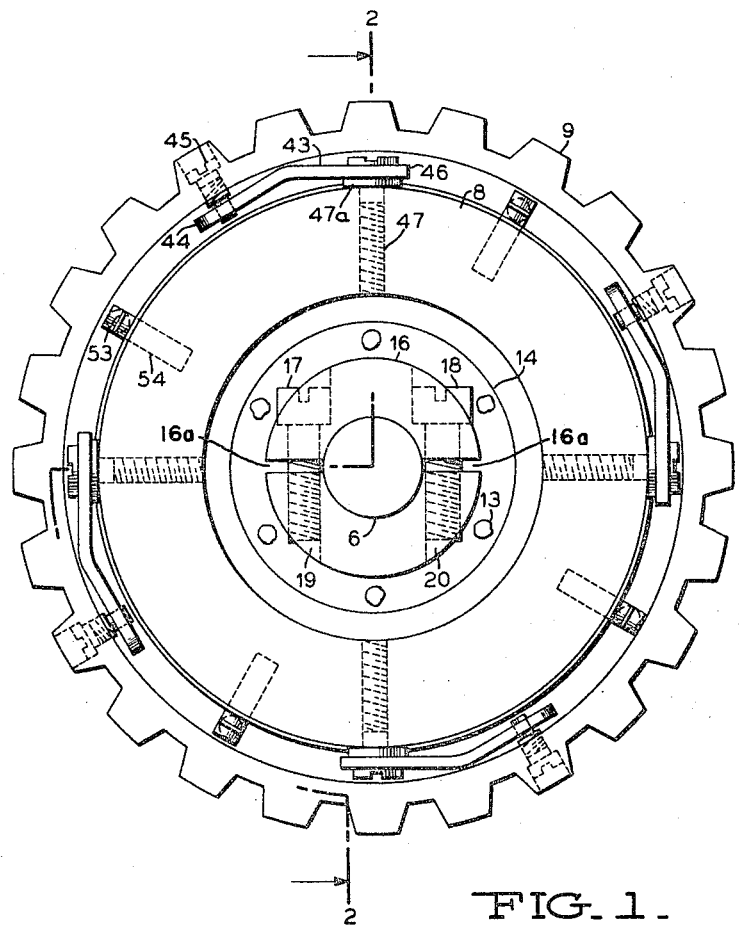
FIG_1.
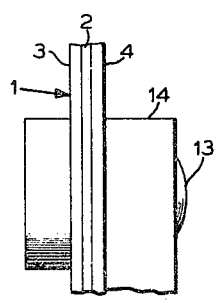
FIG_3.
INVENTOR.
JAMES M. CUNNINGHAM
BY Donald F. Voss
ATTORNEY March 10, 1959  J. M. CUNNINGHAM  2,876,880
LOW INERTIA MAGNETIC DISC CLUTCH
Filed Aug. 9, 1956  2 Sheets-Sheet 2

United States Patent Office 2,876,880
Patented Mar. 10, 1959

2,876,880

LOW INERTIA MAGNETIC DISC CLUTCH

James M. Cunningham, Endicott, N. Y., assignor to International Business Machines Corporation, New York, N. Y., a corporation of New York Application August 9, 1956, Serial No. 603,097

8 Claims. (Cl. 192—84)

This invention relates to electromagnetic apparatus and more particularly to an electromagnetic disc clutch. An object of this invention is to provide an improved electromagnetic disc clutch.

This electromagnetic disc clutch has been devised for a low inertia system, particularly where it is desirable to drive a low mass at high speeds over a predetermined number of degrees of rotation and to do so intermittently without introducing a significant amount of mass into the system. Accordingly, another object of this invention is to provide an electromagnetic clutch having low inertia properties.

A further object of this invention is to provide an electromagnetic clutch having a self-aligning armature.

A still further object of this invention is to provide an electromagnetic clutch having little or no backlash in its operation.

An additional object of this invention is to provide an electromagnetic clutch which does not require lubrication.

It will be seen from the forthcoming description of the clutch structure that the clutch is a self-contained unit and that it may be slipped onto any suitable shaft desired to be driven. This feature has many distinctive advantages such as easy removal of the clutch from the driven shaft and adjustment of the clutch on the shaft. Therefore, another additional object of this invention is to provide an electromagnetic clutch having all of its elements in a self-contained unit which may be attached to any suitable shaft to be driven and be positioned anywhere along the shaft.

A multiple arrangement of these clutches on a shaft to be driven will provide for a wide variety of driving arrangements. For example, several of these clutches can be mounted on a shaft so as to start or stop the shaft and drive the shaft at various speeds, thereby maintaining control of the shaft at all times.

A further additional object of this invention is to provide an electromagnetic clutch having versatile driving characteristics.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a right end elevation of the electromagnetic clutch.

Fig. 3 is a detailed view of the disc construction in its preferred embodiment.

Figure 2:
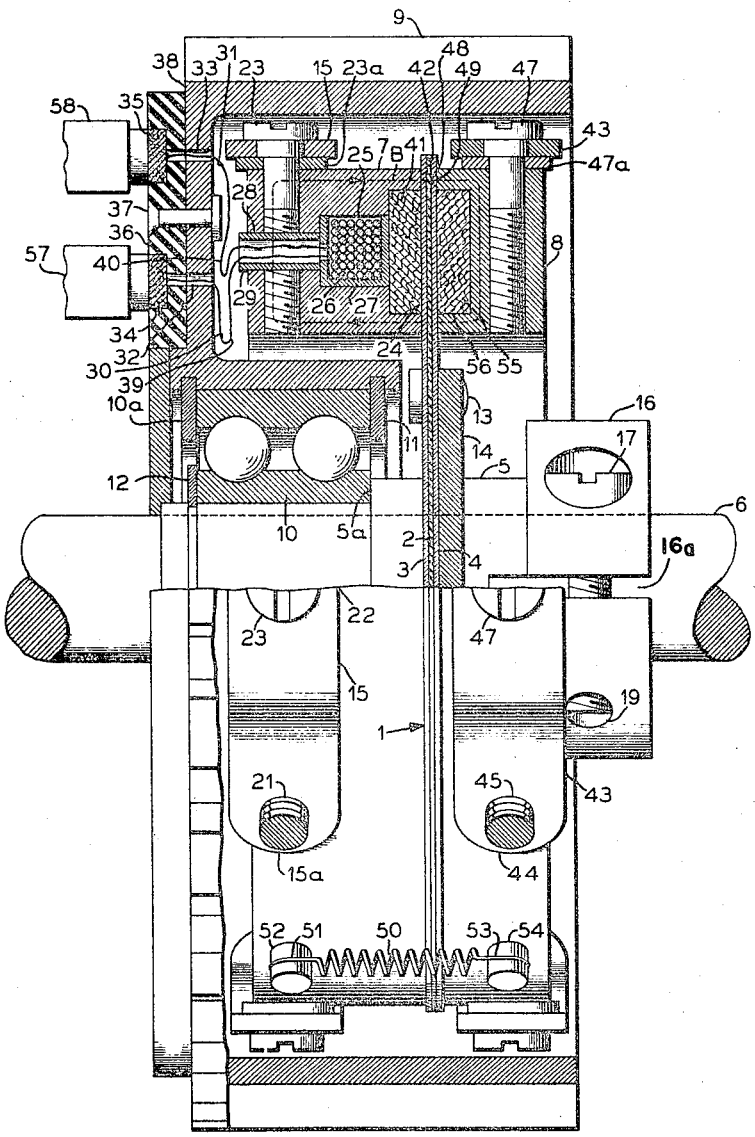
Fig. 2 is a sectional view of the electromagnetic clutch taken on the line 2—2.

For the purpose of maintaining the mass at a minimum (Figs. 2 and 3), a very thin disc 1 composed of a layer of nonmagnetic material 2 interposed between layers of magnetic material 3 and 4 is rigidly connected to a sleeve 5 which is attached to a driven member 6.

The disc 1 is contiguously interposed between a yoke 7 and an armature 8 and since the disc 1 is in contact with said yoke and armature, it is not necessary to utilize any material to reduce the reluctance of a flux path B set up in a manner to be described hereinafter as required in an electromagnetic fluid clutch. Also by providing the nonmagnetic material 2 in the disc structure, the disc 1 will release from the yoke 7 and armature 8 in a reliable manner when the flux path is interrupted. Moreover, by interposing the nonmagnetic material 2 between magnetic layers of material 3 and 4 to comprise the disc structure, the effective reluctance of the nonmagnetic material 2 remains constant, whereas the reluctance would vary if the nonmagnetic material 2 were allowed to wear while the clutch is in operation. However, if the disc were only of nonmagnetic material, a stronger flux field would be required and fulfillment of this requirement would necessarily introduce more mass into the system. The disc 1 may be completely magnetic but if it were, it would have a tendency to reside with the yoke 7 and armature 8 when the flux path is interrupted and would not release a load in a reliable manner.

Referring to the drawings for more specific details of the invention, the electromagnetic clutch comprises a driving member 9 rotatably mounted by means of a ball bearing 10 on the sleeve 5. The driving member 9 is retained on the bearing by retaining springs 10a and 11. The bearing is retained on the sleeve 5 against a shoulder portion 5a of the sleeve by a retaining spring 12. The sleeve 5 carries the thin disc 1 rigidly attached by rivets 13 or other suitable fastening means to a flange or hub portion 14 integral with the sleeve 5. As previously stated, the disc may be entirely of magnetic material but preferably consists of a lamination of nonmagnetic material interposed between magnetic material, the latter construction provides for improved performance of the clutch. The sleeve is adapted to slide over a shaft to be driven, such as shaft 6. A hub clamp 16 having slots 16a integral with the sleeve 5 facilitates attachment of the clutch unit to the driven shaft 6. After the clutch unit is slipped onto the shaft 6 and into position, set screws 17 and 18 are threaded into the tapped holes 19 and 20 of the hub clamp 16 to rigidly secure said clutch unit to said shaft. The driving member 9 supports an annular yoke 7 by means of a plurality of straps 15 equally spaced from each other around the periphery of the yoke. The straps are pivotally attached on one end 15a to a pin 21 secured to the driving member 9 and extending inwardly therethrough but clear from the yoke 7. The other end of the strap 22 is pivotally attached to the outer periphery of the yoke 7 by means of a bolt 23 rigidly secured to said yoke and spaced therefrom by a washer 23a. This type of support allows for axial movement of the yoke 7 without flexing the straps or support members 15, therefore improving the life of the support members. Also this type of support overcomes the objectionable features of splining one member to another for axial movement, since it reduces backlash in the system and eliminates lubrication problems involved in splined supports.

The yoke 7, disposed to contact the face 24 of the disc 1, is provided with a recess 25 to contain an annular electromagnetic coil 26 wound around a spool 27 and with suitable passages or openings 28 for receiving a tubular portion 29 of the spool 27 which provides a passageway for the leads 30 and 31 of the coil 26. The leads 30 and 31 of the coil 26 pass through suitable openings 32 and 33, respectively, in the driving member 9 and are attached to a set of slip rings 34 and 35 contained in an annular plate of insulating material 36 fixedly attached by means of rivets 37 to the face 38 of the driving member. The leads of the coil have a sufficient slack portion 39 and a portion 40 so that they will not disconnect from the slip rings upon movement of the yoke.

An annular ring of nonmagnetic material 41 suitably bonded or molded over the spool 27 retains the spool in the recess 25. The nonmagnetic material is even with the face 42 of the yoke so as to form a part thereof. This arrangement improves the wearability of the face 42 in addition to providing a more stable coefficient friction between the yoke 7 and disc 1, thereby providing reliable load releasing characteristics. An annular armature 8 is also supported by the driving member 9 by means of a plurality of straps 43 equally spaced from each other around the periphery of the armature. The straps 43 are pivotally attached on one end 44 to a pin 45 secured to the driving member 9 and extending inwardly therethrough but clear from the armature. The other end of the strap 46 is pivotally attached to the outer periphery of the armature by means of a bolt 47 rigidly secured to said armature and spaced therefrom by a washer 47a. The face 48 of the armature complementary to the face 42 of the yoke is disposed to contact the surface 49 of the disc 1. A plurality of springs 50, attached on one end 51 to radially extending pins 52 fixed to the yoke 7 and on the other end 53 to radially extending pins 54 fixed to the armature 8, urge the yoke and armature toward each other, thereby maintaining the yoke and armature in contact with the disc 1 and providing automatic adjustment of the yoke and armature with respect to their position to the disc as they wear during clutch operation.

An annular ring of nonmagnetic material 55 is bonded or molded in a recess 56 provided in the armature. This annular ring of nonmagnetic material is even with the face 48 to form a part thereof and aids in reducing the wear of the armature in addition to providing a stable coefficient of friction between the armature and the disc.

Current is supplied to the coil 26 by a set of brushes 57 and 58 disposed to contact the slip rings 34 and 35, respectively. The torque of the clutch may be varied by varying the excitation of current supplied to the coil to accelerate or decelerate the load.

In operation of the clutch, a flux path B is established by supplying an established amount of current to the coil. The yoke 7 and armature 8 being in contact with the disc 1 grip the disc with the force created by the flux path, thereby coupling the driving member 9 with the driven shaft 6 through the disc 1. Since there is no appreciable movement between the yoke, disc and armature, and since the disc is fixed to a sleeve rigidly attached to the driven shaft, there is very little, if any, backlash in the system. The driving member is disconnected from the driven shaft by cutting off the current supply to the coil. The driven shaft may then be returned to its state previous to being connected with the driving member by various arrangements dependent upon the type of drive desired. The clutch mechanism as described may be used to connect a driving member to a driven shaft at rest or a driven shaft already rotating.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electromagnetic clutch comprising a rotatable input member, an output member rotatable coaxially with said input member, a thin disc having two sides and rigidly connected to said output member, annular magnetic members disposed axially to each side of said disc and connectable to said input member to move axially toward one another, pivotal connecting means for connecting said magnetic members to said input member, means for constantly holding said magnetic members in contact with said disc and means for inductively magnetizing said magnetic members to actuate them toward one another.

2. An electromagnetic clutch comprising a rotatable driving member, a driven member rotatable coaxially with said driving member, a sleeve connectable to said driven member and supporting said driving member, a means integral with said sleeve for connecting said sleeve to said driven member, a thin disc having two sides and rigidly connected to said sleeve, annular magnetic members disposed axially to each side of said disc and connectable to said driving member, pivotal connecting means for connecting said magnetic members to said driving member, means for constantly holding said magnetic members in contact with said disc and means for magnetizing said magnetic members to actuate them toward one another.

3. An electromagnetic clutch according to claim 2 wherein the thin disc is of magnetic material.

4. An electromagnetic clutch according to claim 2 wherein the thin disc comprises a first magnetic disc having two sides, a two sided non-magnetic disc attached to one side of said first magnetic disc and a second magnetic disc having two sides with one of the sides attached to the other side of said non-magnetic disc.

5. An electromagnetic clutch according to claim 2 wherein the annular magnetic members disposed axially to each side of the disc have complementary faces in contact with said disc.

6. An electromagnetic clutch according to claim 5 wherein the complementary faces of the magnetic members are centrally provided with complementary recesses and non-magnetic material having a stable co-efficient of friction contained in said recesses in a manner that the non-magnetic material is flush with the complementary faces.

7. An electromagnetic clutch according to claim 2 wherein the means for connecting the magnetic members to the driving member comprises a plurality of peripheral spaced straps pivotally connected to said magnetic members and said driving member.

8. An electromagnetic clutch according to claim 2 wherein the means for constantly holding said magnetic members in contact with said disc comprises a series of pins fixed around the periphery of said magnetic members and extending radially outward therefrom and a plurality of springs connected in tension to said pins thereby holding said magnetic members in constant contact with said disc.

References Cited in the file of this patent

UNITED STATES PATENTS

| | | |
|---|---|---|
| 736,789 | Schuster | Aug. 18, 1903 |
| 1,325,011 | Fernow | Dec. 16, 1919 |
| 2,308,370 | Kellett | Jan. 12, 1943 |
| 2,470,103 | Lochman | May 17, 1949 |
| 2,580,869 | Winther | Jan. 1, 1952 |
| 2,674,359 | Rostu | Apr. 6, 1954 |
| 2,690,819 | Meyer | Oct. 5, 1954 |